United States Patent [19]
Meyer et al.

[11] 3,942,895
[45] Mar. 9, 1976

[54] LINEAR DIGITAL READOUT ASSEMBLY FOR MILLING MACHINES AND THE LIKE AND MEANS FOR MOUNTING SAME

[75] Inventors: Robert Meyer, Mechanicville; Robert S. Scher, Elnora, both of N.Y.

[73] Assignee: Teledyne, Inc., Troy, N.Y.

[22] Filed: Sept. 4, 1973

[21] Appl. No.: 393,967

[52] U.S. Cl. ............................. 356/169; 33/125 C
[51] Int. Cl.² ........................................ G01B 11/04
[58] Field of Search .................... 356/156, 170, 169; 250/231 R, 237 G; 33/125 C

[56] References Cited
UNITED STATES PATENTS

| | | | |
|---|---|---|---|
| 3,533,703 | 10/1970 | Wingate | 356/170 |
| 3,600,811 | 8/1971 | Weyrauch | 356/169 X |
| 3,816,003 | 6/1974 | Litke | 356/169 |

OTHER PUBLICATIONS

Gurley, "Data Sheet 8706" Teledyne Gurley, Troy, N.Y. Apr. 1, 1970.
Gurley, "Data Sheet 8716" Teledyne Gurley, Troy, N.Y. Oct., 1970.
Gurley, "Data Sheet 8712" Teledyne Gurley, Troy, N.Y. Aug., 1971.
IKL, "Linear Glass Scale Measuring System" IKL, Inc. Newport Beach, Calif. May 1969.
Baldwin Electronics Corp. "Model LE Linear Encoder Incremental Position," 5/12/71.

Primary Examiner—Alfred E. Smith
Assistant Examiner—Matthew W. Koren
Attorney, Agent, or Firm—Shoemaker and Mattare

[57] ABSTRACT

A linear digital readout assembly for milling machines and the like and structure for mounting the same to the machine, comprising a preassembled, prealigned scale and reading head assembly, with the scale and reading head, respectively, carried by adjacent, relatively movable parts of the machine and operatively connected to a digital display unit to give a visual digital indication of relative movement between said movable parts of the machine, and unique mounting structure securing the scale to one of said movable parts and securing the reading head to the other of said movable parts, said mounting structure enabling said scale and reading head to be secured to the respective parts of the machine with a minimum amount of effort and in a minimum amount of time and resulting in a durable, accurate and economical digital indicator for relative movements between the parts of the machine.

9 Claims, 15 Drawing Figures

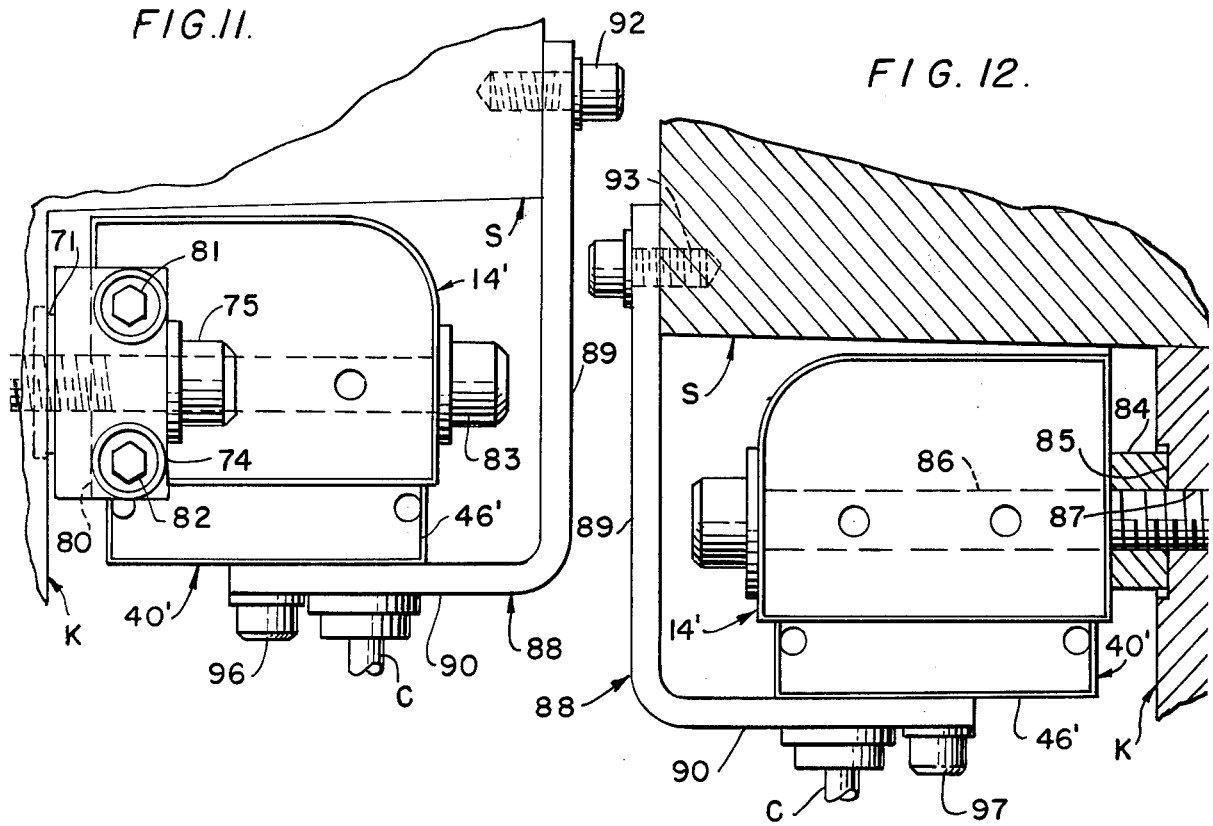
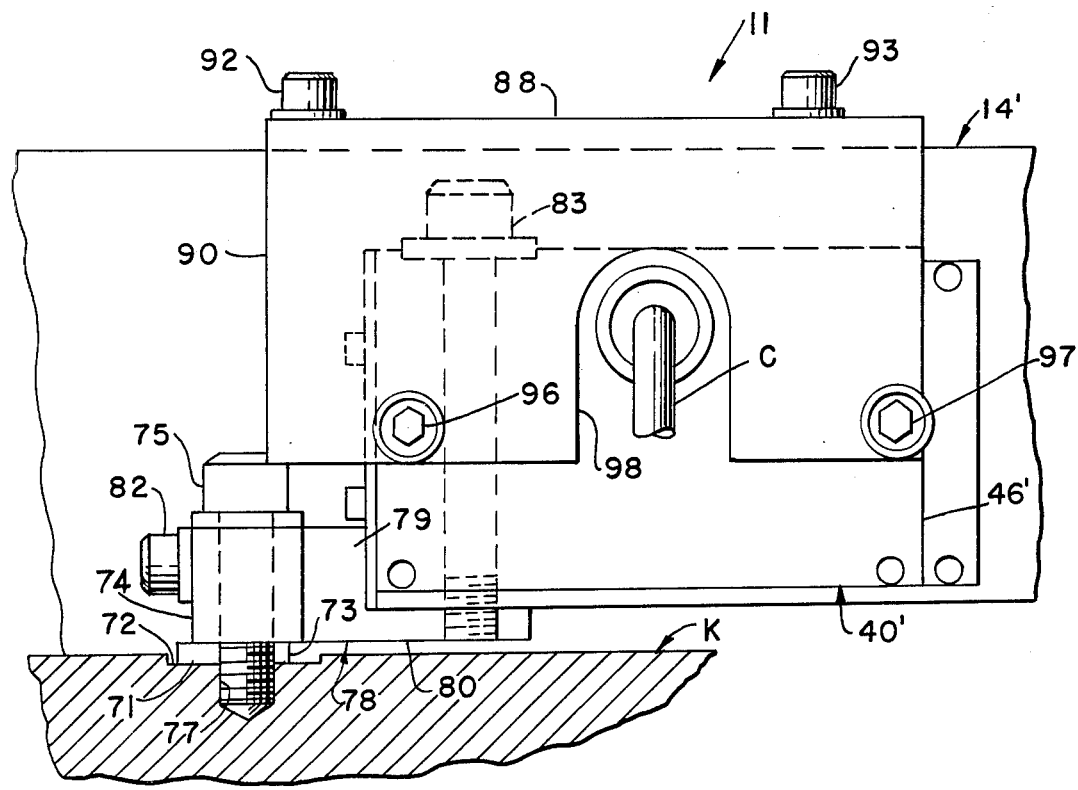

3,942,895

LINEAR DIGITAL READOUT ASSEMBLY FOR MILLING MACHINES AND THE LIKE AND MEANS FOR MOUNTING SAME

BACKGROUND OF THE INVENTION

This invention relates to a linear digital readout for giving a visual digital indication of relative movements between parts of a machine and the like, and to a unique means for mounting the linear digital readout to the machine and the like.

In particular, the present invention relates to a unique linear digital readout and unique means for mounting the same to a machine, such as a Bridgeport milling machine, and the like. The linear digital readout of the present invention comprises a scale carried by one movable part of the machine and a reading head carried by another, adjacent movable part of the machine and in operative association with the scale. The reading head is connected with a digital display unit to give a visual digital indication of relative movements between said two parts of the machine. Unique mounting means is connected with the scale to secure the scale to said one part of the machine and unique mounting means is connected with the reading head to secure the reading head to said other movable part of the machine, said mounting means enabling said scale and reading head to be connected to the machine in a minimum amount of time and with a minimum amount of effort to give a durable and economical linear digital readout for the machine.

The scale and reading head are preassembled and prealigned at the factory and, accordingly, all that is necessary for the operator to do is to secure the scale and reading head to their respective parts of the machine and to make minor adjustments to accurately align the readout with the machine.

More specifically, the scale is supported in a housing which is secured by the mounting means to said one part of the machine, and the housing has reading head guide ways therein, which are aligned with the ways of the machine and, accordingly, with the reading head secured by the mounting means to the other movable part of the machine, relative movement between the scale and reading head is parallel to and guided by the ways of the machine.

A linear digital readout, as described above, is exceptionally time saving and economical to use and eliminates the necessity of an operator of the machine to read various micrometer scales and the like which is tedious and requires a great amount of time and is highly susceptible to error on the part of the operator. With the present invention, the scale and reading head are quickly and easily attached to the respective parts of the machine and when operatively positioned, they give a digital visual readout on a display unit, thus significantly increasing the speed with which an operator is enabled to operate the machine and resulting in a substantial savings in the use of the machine.

OBJECTS OF THE INVENTION

It is an object of this invention to provide a linear digital readout for machines such as a Bridgeport milling machine and the like, wherein a unique mounting means secures a scale and a reading head, respectively, to adjacent, relatively movable parts of the machine for cooperation between the scale and reading head to give a digital indication of the amount and direction of movement between the parts of the machine.

Another object of the invention is to provide a unique means for quickly and easily mounting a preassembled, prealigned scale and reading head to adjacent, relatively movable parts of a machine, such as a Bridgeport milling machine, and the like, utilizing pre-existing mounting structure and openings on the machine to which the mounting means for the scale and reading head are attached.

BRIEF DESCRIPTION OF THE DRAWINGS

FIG. 11 is a fragmentary view in elevation from the left-hand end or front of the machine looking at the end of the linear digital readout on the side of the machine.

FIG. 12 is a fragmentary view in elevation from the right-hand end of the unit on the side of the machine.

FIG. 13 is a fragmentary view from the bottom of the left-hand end of the scale, reading head and mounting means at the side of the machine.

DETAILED DESCRIPTION OF THE INVENTION

Figure 1:
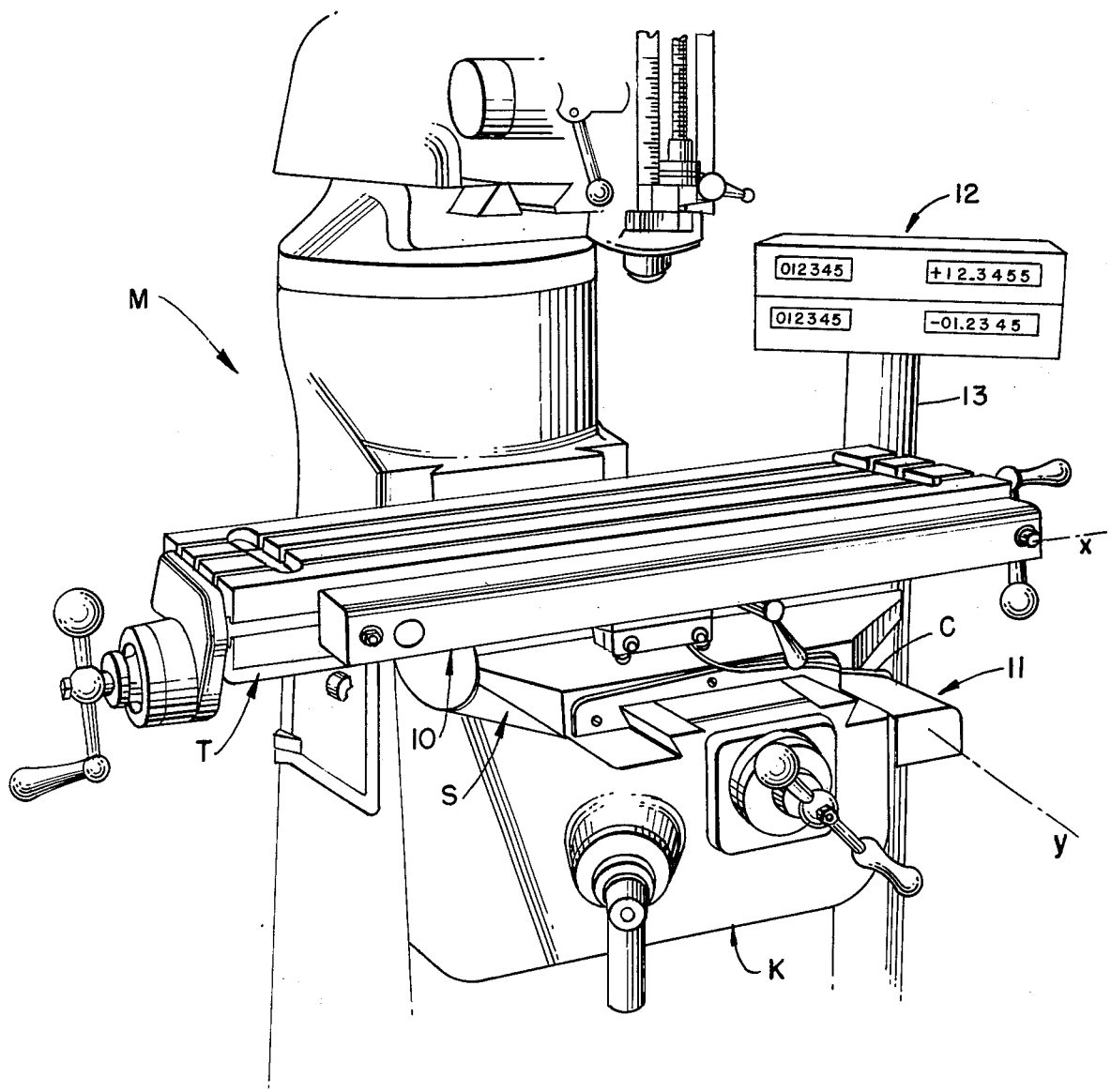
FIG. 1 is a front perspective view of a machine with the linear digital readout of the present invention secured thereto.
Figure 2:
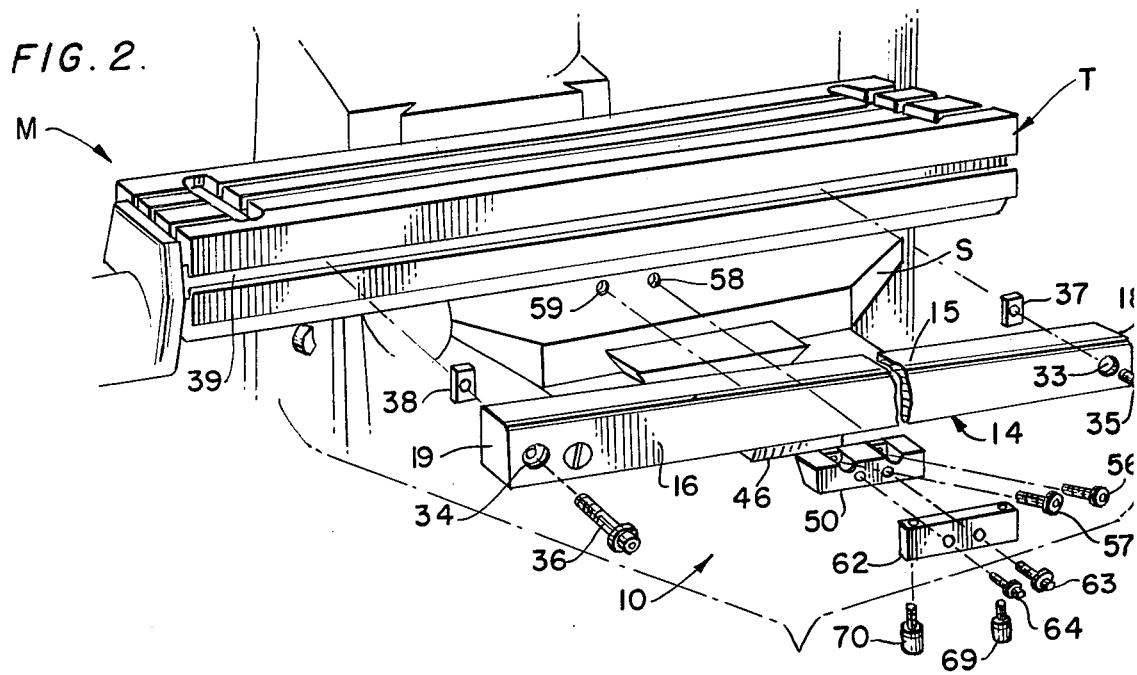
FIG. 2 is a fragmentary exploded perspective view of a portion of the front of the machine of FIG. 1 and showing the scale, reading head and mounting means for the longitudinal or X-axis of the machine.

In the drawings, wherein like reference numerals indicate like parts throughout the several views, a machine, such as a Bridgeport milling machine, or the like is indicated generally at M and comprises a knee K which normally does not move in a horizontal direction, a saddle S mounted on the knee for back and forth movement relative thereto along the Y-axis and a table T mounted to the saddle S for back and forth movement relative thereto along the X-axis.

A linear digital readout scale and reading head assembly 10 are mounted to the front of the machine for measuring relative movements between the table T and saddle S in the X direction and a linear digital readout scale and reading head assembly 11 are mounted to the side of the machine to measure relative movement between the saddle and knee of the machine in the Y direction. The scale and reading head assemblies 10 and 11 are operatively connected by means of suitable cables or the like C to a suitable digital display unit 12 supported on a stand 13 adjacent the machine in an unobtrusive, yet readily visible, position.

Details of construction of the scale and reading head assembly and the mounting means therefor for the front of the machine are seen best in FIGS. 2 and 4–10. The scale comprises an elongate housing 14 of substantially inverted U-shaped cross-sectional configuration and having a top wall 15, front wall 16 and back wall 17. The opposite ends of the housing 14 are preferably closed by suitable removable end closure plates 18 and 19. A longitudinally extending scale mounting channel 20 is in the underside of top wall 15 of housing 14 and a suitable, elongate scale 21 is suitably secured at one edge thereof in the channel 20 and projects downwardly therefrom into the housing in the space between front and back walls 16 and 17. The scale 21 is preferably of glass with vacuum deposited chrome indicia thereon. A pair of opposed facing slots 22 and 23 are in the inner facing lower edge portions of front and back walls 16 and 17, respectively, and slots or channels 22 and 23 define guide channels for a seal spring or band 24, received at its opposite edges in the channels 22 and 23. Tubular sleeves or bushings 25 and 26 are received at their opposite ends through aligned openings 27 and 28 and 29 and 30 in the front and back walls 16 and 17, respectively, of the housing 14 at opposite ends thereof and suitable tubular hubs or spools 31 and 32 are rotatably supported on the sleeves or bushings 25 and 26 and the seal spring 24 is wound around the hubs or spools 31 and 32 at opposite ends of the housing. Access notches or cutouts 22' and 23' are provided in the inner surfaces of the walls 16 and 17 for providing access of the opposite edges of the spring 24 to the slots 22 and 23.

The bushings 25 and 26 define mounting openings 33 and 34 therethrough at opposite ends of the housing and adjustable mounting means for the housing and scale includes elongate cap screws 35 and 36 extended through the openings 33 and 34, respectively, and threadably engaged with rectangularly shaped T-nuts 37 and 38 positioned in a T-shaped slot 39 extending along the front of the table T. The housing 14 and scale 21 are thus securely held to the front of the table T by tightening the cap screws 35 and 36 in the respective T-nuts 37 and 38 held in the slot 39 parallel with the ways of the machine and the direction of movement of the table T.

A reading head 40 is longitudinally movable within the housing 14 between the front and back walls 16 and 17 and comprises a substantially U-shaped support bracket 41 carrying a collimated light source 42 on one side thereof and a pickup unit 43 on the other side thereof connected with a suitable integrated circuitry 44 supported in a slide housing 45 extending at its opposite side edges beneath the lower edge surfaces 16a, 17a of front and back walls 16 and 17, said surfaces comprising prealignment means or guide ways for the reading head 40 and having a removable prealignment spacer means, such as low friction tape t, applied thereto at the time of manufacture, but removed therefrom during mounting of the assembly to a machine, as described hereinafter. A slide plate 46 is secured to the bottom of slide bracket or housing 45 confining and protecting the integrated circuitry 44 therein. A suitable plug means 47 and conduit or cable C connect the integrated circuit 44 with the display unit 12. The slide housing or bracket 45 is secured at its opposite ends to adjacent end portions of the spring 24 wound on the respective spools 31 and 32 at opposite ends of the housing and the spring 24 is held in tension and thus seals the space above the spring 24 and between walls 16 and 17 from contaminants, such as dirt, chips, oil and the like. Suitable L-shaped dust plates 48 and 49 are secured in the opposite ends of the housing to the lower edge portions of end walls 18 and 19 to seal the space between the springs and the end walls or plates 18 and 19. The reading head 40 is secured to the saddle S by means of adjustable reading head mounting means comprising an elongate mounting block 50 having a substantial trapezoidally-shaped cross-sectional configuration and a pair of spaced apart mounting openings 51 and 52 extending from the top surface 53 thereof through the rear surface 54 thereof. The angle of inclination of rear surface 54 is selected such as to make the front surface 55 of mounting block 50 parallel to the front surface of table T or, on other words, substantially vertical. A pair of cap screws 56 and 57 are extended through the mounting openings 51 and 52 in mounting block 50 and into preexisting openings 58 and 59 in the saddle S. The openings 58 and 59 normally are used to mount a stop bracket, not shown, to the saddle and which extends upwardly in front of the slot 39 in table T. This stop bracket is removed prior to installation of the linear digital readout of the present invention. A pair of openings 60 and 61 are formed in the front surface 55 of mounting block 50 and a slide block 62 of substantially rectangular configuration is secured to the front surface 55 by means of a pair of cap screws 63 and 64 extended through aligned openings 65 and 66 in the slide block 62 and into the openings 60 and 61 in mounting block 50. A pair of vertically extending openings 67 and 68 extend through the slide block 62 adjacent the opposite ends thereof and a pair of cap screws 69 and 70 extend upwardly through these openings and into the bottom of slide plate 46 on the reading head unit 40.

The cross-feed or Y-axis linear digital readout 11 also comprises an elongate housing 14' having a top wall 15' and front and back walls 16' and 17' and is closed at its opposite ends by end closure plates 18' and 19'. A reading head assembly 40' is movable along the housing 14' and as in the longitudinal or X-axis linear digital readout, includes a slide plate 46' positioned below the lower edge surfaces of the front and back walls 16' and 17' and engagable therewith. The lower edge surfaces 16'a, 17'a of the front and back walls comprise ways for the linear digital readout head 40'.

The internal construction of the cross-feed or Y-axis linear digital readout 11 is substantially identical to that previously described, and includes an elongate scale 21', sealing spring 24', integrated circuitry 44' and bushings and sleeves 25', 26' and 31', 32' at opposite ends thereof.

Figure 3:
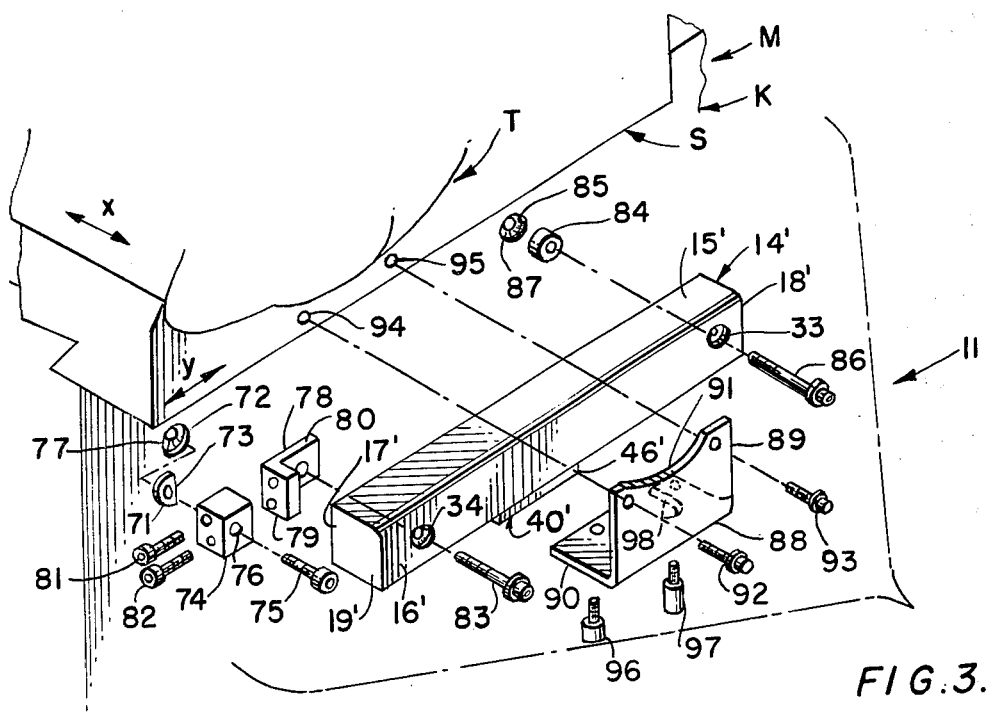
FIG. 3 is a fragmentary exploded perspective view of a portion of the side of the machine of FIG. 1 and showing the scale, reading head and mounting means for the cross feed or Y-axis of the machine.
Figure 4:
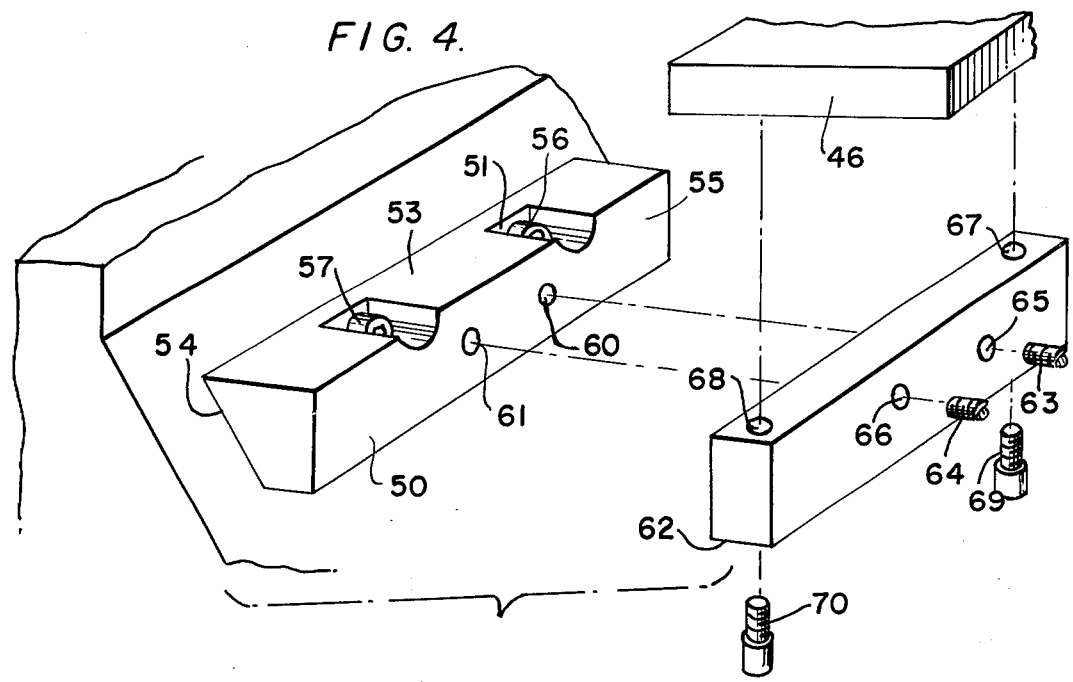
FIG. 4 is a fragmentary, exploded, perspective, greatly enlarged view of a portion of the mounting means for the reading head at the front of the machine.
Figure 5:
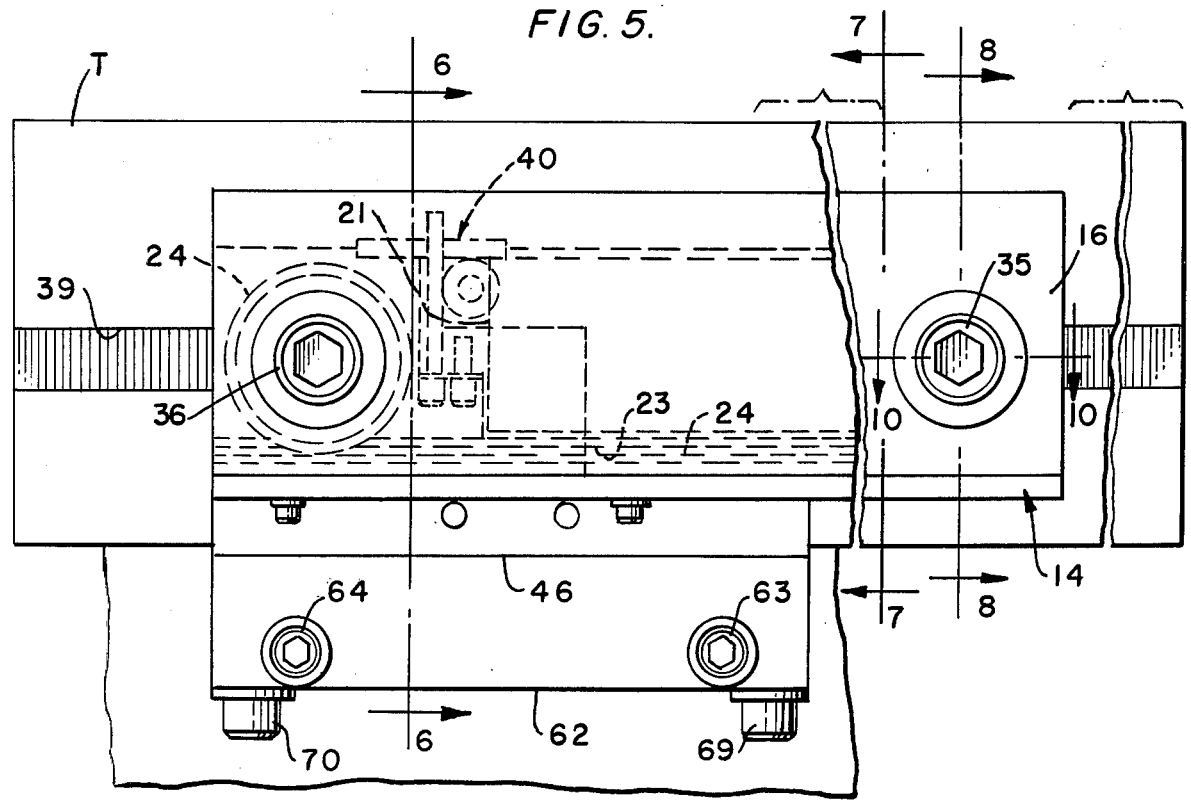
FIG. 5 is an enlarged fragmentary view in elevation, with portions broken away, of the scale and reading head secured to the front of the machine.
Figure 6:
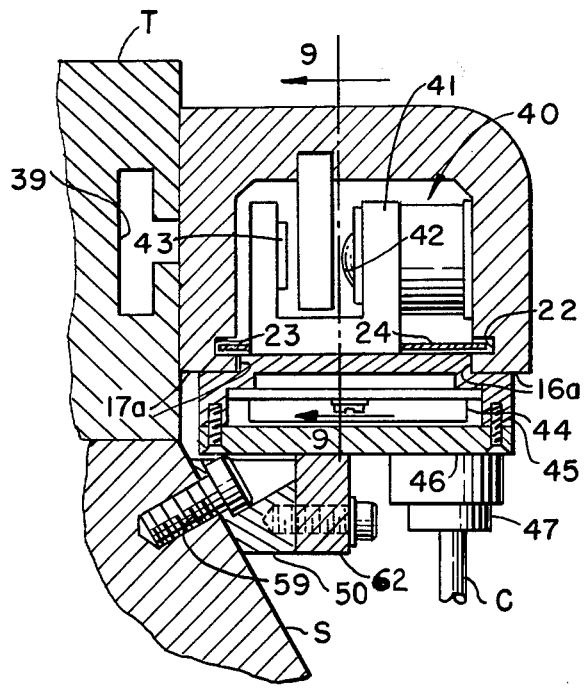
FIG. 6 is an enlarged fragmentary view in section taken along line 6—6 in FIG. 5.
Figure 7:
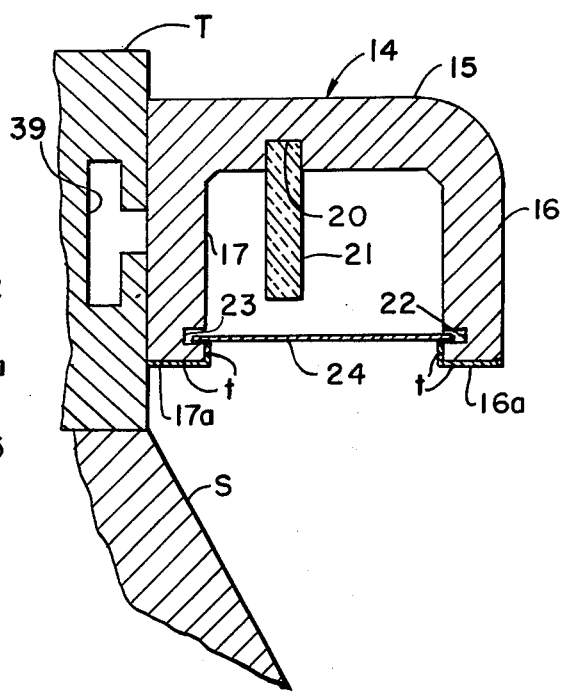
FIG. 7 is a fragmentary view in section taken along line 7—7 in FIG. 5.
Figure 8:
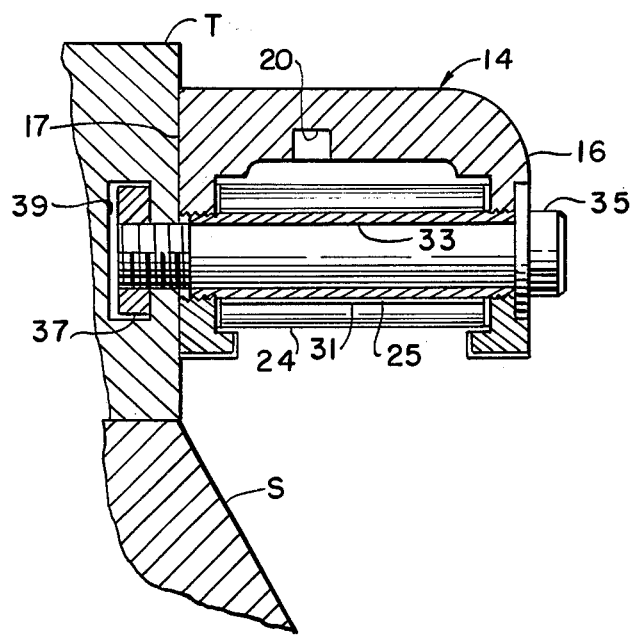
FIG. 8 is a fragmentary view in section taken along line 8—8 in FIG. 5.
Figure 9:
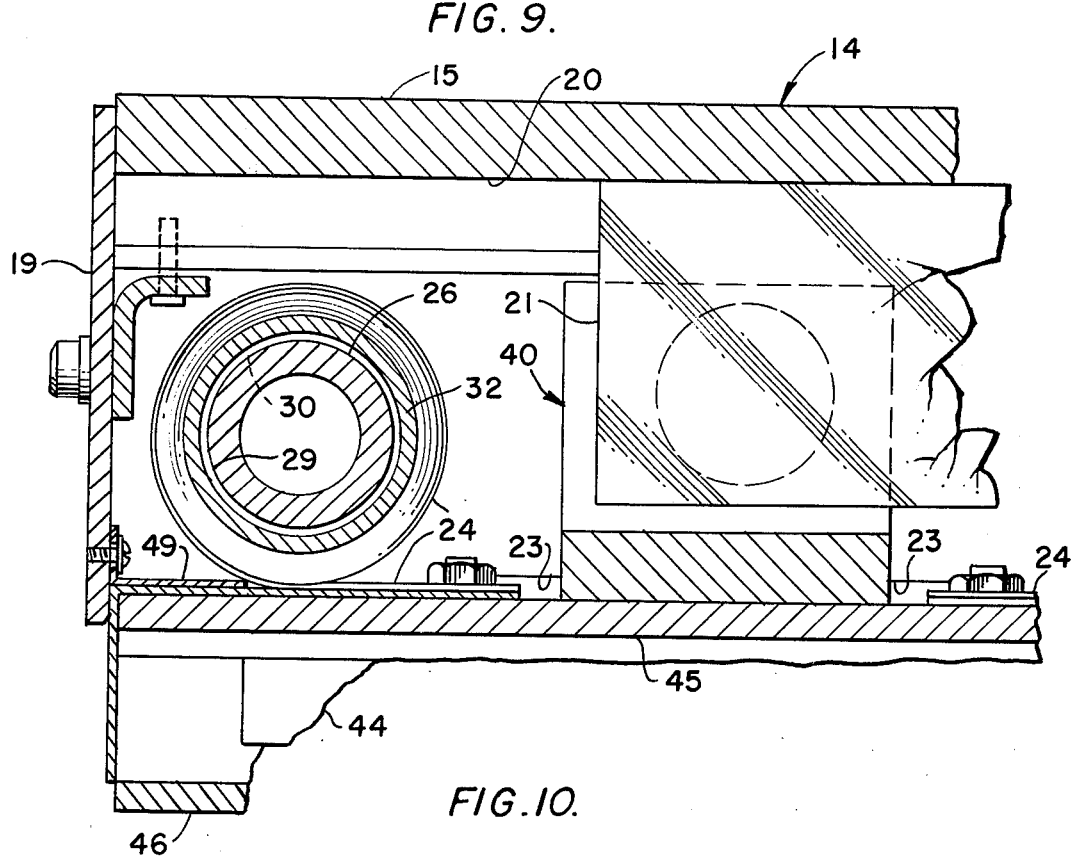
FIG. 9 is a slightly enlarged fragmentary view in section taken along line 9—9 in FIG. 6.
Figure 10:
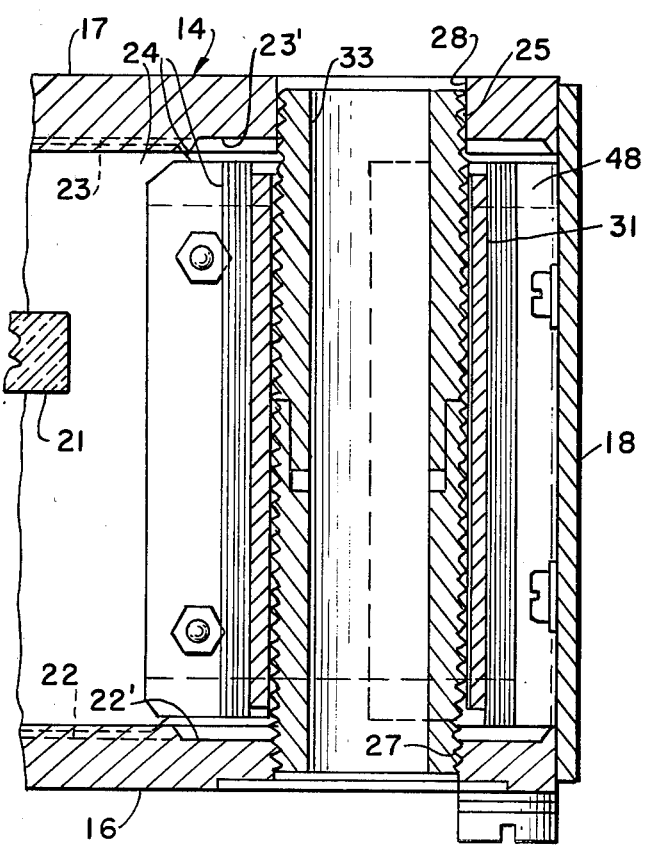
FIG. 10 is an enlarged fragmentary view in section taken along line 10—10 in FIG. 5.

The mounting means for the cross-feed or Y-axis linear digital readout is substantially different from that previously described, however. At the left-hand end of the housing 14', as viewed in FIG. 3, a spacer 71 is positioned in a preexisting opening 72 in the knee K and has a flat edge 73 thereof facing to the right. A substantially rectangularly shaped mounting block 74 is secured to the knee by means of a cap screw 75 extended through an opening 76 in the mounting block and through the spacer 71 and into a threaded opening 77 in the knee K. A mounting bracket 78 of substantially L-shaped configuration, and including a pair of legs 79 and 80 extending at right angles to one another, is secured at leg 79 to the side of mounting block 74 by means of a pair of cap screws 81 and 82 extended through spaced openings in the mounting block and into aligned spaced openings in the leg 79 of mounting bracket 78. A cap screw 83 is extended through the opening 34 in the left end of housing 14' and into an aligned opening in the leg 80 of mounting bracket 78 to secure the left end of the housing 14' to the knee K. At the right-hand end of the machine a substantially cylindrically shaped spacer 84 is positioned at a preexisting opening 85 in the knee K and a cap screw 86 is extended through opening 33 in the right end of housing 14' and through the spacer 84 and into a threaded opening 87 in the knee K to secure the right end of housing 14' to the knee. A substantially L-shaped mounting plate 88, having a pair of legs 89 and 90 disposed at substantially a right angle to one another, is secured to the end of saddle S and to the plate 46' of reading head unit 40' to secure the reading head to the saddle S for movement therewith and relative to the housing 14' and scale 21 confined therewithin. The upper end edge of leg 89 of mounting plate 88 has an arcuately shaped cutout portion 91 therein to provide clearance for the lower edge of the table T as the table is moved transversely of the saddle S and a pair of cap screws 92 and 93 are extended through openings adjacent the opposite upper corners of leg 89 and into a pair of preexisting openings 94 and 95 in the side of the saddle S beneath the table T. A pair of cap screws 96 and 97 extend through spaced openings in the opposite side edge portions of leg 90 of mounting plate 88 and into the slide plate 46' of reading head unit 40' to thus secure the reading head unit to the saddle S. A slot 98 is formed in the edge of leg 90 of mounting plate 88 for the power cord plug to the reading head unit 40'.

Figure 15:
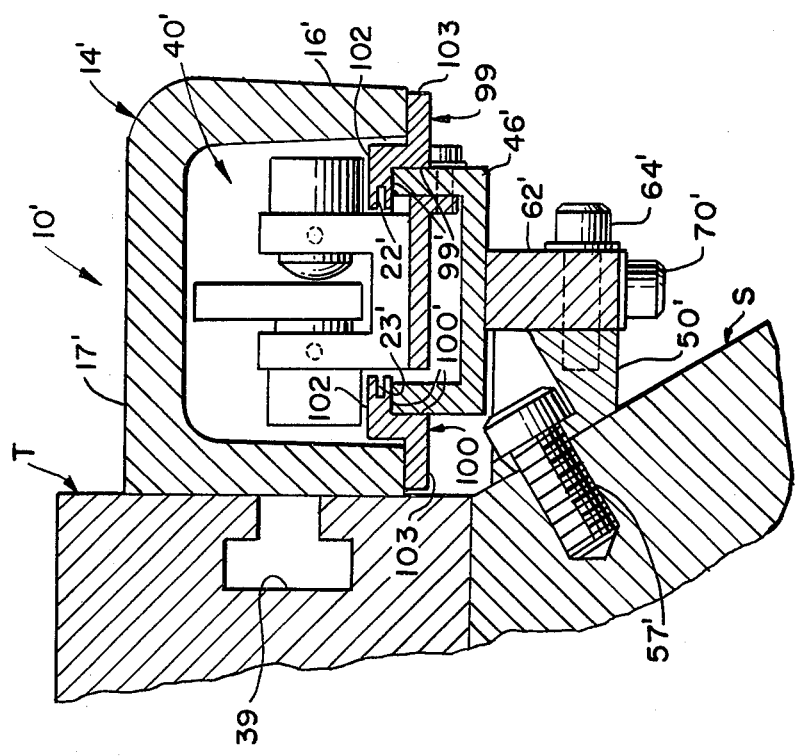
FIG. 15 is a view in section taken along line 15—15 in FIG. 14.
Figure 14:
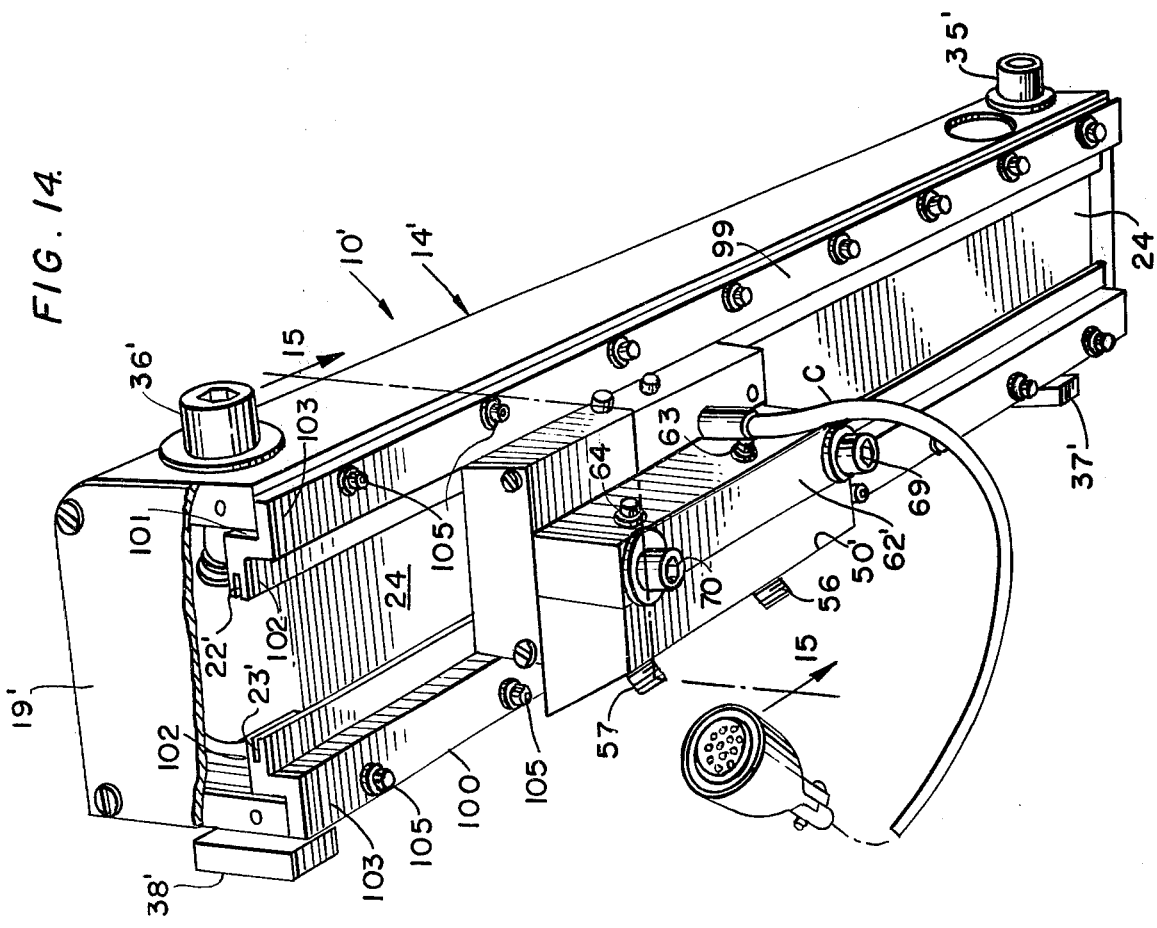
FIG. 14 is a bottom perspective view of a modification of the invention.

A modification of the linear digital readout assembly of the invention for the longitudinal or X-axis is indicated generally at 10' in FIGS. 14 and 15 and is substantially identical in every respect with the form of the invention illustrated and described in FIGS. 2 and 4–10, except that rather than the sealing spring channels 22 and 23 in the inner lower edge surfaces of front and back walls 16 and 17 of the housing 14, a pair of separate elongate ways or track members 99 and 100 are suitably secured to the lower edge surfaces of front and back walls 16' and 17' of the housing 14'. Each track member 99 and 100 includes a vertically extending web portion 101 and a pair of upper and lower, oppositely laterally extending portions 102 and 103. The inner confronting edge surfaces of upper laterally extending portion 102 have elongate, longitudinally extending channels 22' and 23' therein for receiving the opposite edges of the sealing spring 24 and the lower oppositely laterally directed portions 103 are suitably secured against the lower edge surfaces of front and back walls 16' and 17' by means of a plurality of cap screws 105 or the like extended therethrough and into the walls 16' and 17'. Also, the slide plate 46' is slightly modified, in that it does not extend outwardly beneath the lower edge surfaces of walls 16' and 17', but rather fits within the ways or guide channels 99' and 100' defined by the opposed confronting portions 102 and the vertical portions 101 of the track members 99 and 100, respectively.

To assemble the longitudinal or X-axis linear digital readout assembly 10 to the machine, the stop bracket, not shown, is first removed from the saddle S and from adjacent the front edge of table T. The surface of the saddle S adjacent the front thereof and the front surface of table T are thoroughly cleaned, as are the T-shaped slot 39 and the threads of openings 58 and 59, to remove all chips, oil, dirt and the like therefrom. The mounting block 50 is attached to the saddle by means of cap screws 56 and 57 extended into openings 58 and 59. The cap screws 35 and 36 are then extended through the openings 33 and 34 in opposite ends of housing 14 and the T-nuts 37 and 38 threaded onto the end of the cap screws 35 and 36. The housing 14 is then positioned at the right-hand end of the table T and the nuts 38 and 37 are slid into the T-slot 39 from the right-hand end thereof. The table T is cranked or moved to the extreme left-hand position and the housing 14 is positioned along the slot 39 such that the slide plate 46 of reading head unit 40 is positioned over the mounting block. In this initial position, the reading head unit 40 is at the extreme right-hand end of the housing 14. The right-hand end of housing 14 is then pushed firmly downwardly to ensure that the T-slot nut 37 and cap screw 35 are as close to the bottom of the T-slot 39 as they will go and the cap screw 35 is then tightened. The slide block 62 is then attached to the mounting block 50 and to the slide plate 46 and during this attachment the slide block 62 is pushed firmly inwardly and upwardly to position the slide block solidly against the mounting block and the slide plate 46 of the reading head 40. The cap screws 69, 70 and 63 and 64 are then tightened in this position. The table T is then moved slowly to the full right-hand position and care is taken to ensure that the reading head moves along the ways or bottom edge surfaces 16a and 17a of the housing 14 without digging into or tearing the strips of protective, Teflon coated tape $t$, placed on these surfaces at the time of manufacture of the assembly. With the table in the full right position, the left end of the housing 14 is pushed firmly downwardly to make sure that the tape on the ways 16a and 17a is in contact with the corresponding reading head surfaces and the cap screw 36 is then tightened. The table is then moved slowly to the full left position and the reading head is observed to ensure that no excessive binding between the reading head and the tape occurs. If there is no excessive binding, the tape is then removed and the reading head, accordingly, has a floating movement relative to the housing 14 and ways 16a and 17a and movement between the head and scale is guided by the ways of the machine. Also, the space between the reading head 40 and ways 16a and 17a and between the reading head and scale 21 is selected such that the space between adjacent confronting surfaces of the reading head or slide plate 46 and the ways 16a and 17a of the housing 14 is less than the space or distance between the components 41, 42 and 43 of the reading head 40 and the scale 21. Thus, the reading head 40 will not contact the scale in the event of misalignment, but will rather engage the ways of the housing and thus prevent damage to the scale.

Installation of the cross-feed or Y-axis linear digital readout assembly is accomplished as follows. All mounting holes and mounting surfaces on the saddle and knee for the linear digital readout assembly 11 are thoroughly cleaned of all chips, oil, dirt and the like. The saddle S is cranked to the extreme "in" position (away from the operator) or to the right, as viewed in FIG. 3. The housing 14' is positioned to the side of the knee and the spacer 71, mounting block 74 and mounting bracket 78 are positioned and mounted to the knee by means of cap screws 75, 81 and 82, and the left end of housing 14' is mounted to the knee by the cap screw 83 extended through the opening 34 in the housing 14' into the opening in the leg 80 of bracket 78. The cap screw 86 is then extended through opening 33 at the other end of housing 14' and through spacer 84 into opening 87. The mounting plate 88 is then positioned so that it is aligned over the holes 94 and 95 in the saddle, and the reading head or plate 46' and the saddle are repositioned to align the bracket 88 with the mounting holes in plate 46', but the saddle is kept as far in the "in" position as practical. Firm hand pressure is applied against the plate 88 so that it is forced upwardly and inwardly against the end of the saddle and against the underside of the reading head or plate 46' to thereby push the reading head firmly against the tape $t$ on the housing ways 16'a and 17'a. The saddle is moved slowly to the full out or left position, as viewed in FIG. 3, and the reading head is observed as it moves along the taped ways of the housing 14' to ensure that the reading head does not dig into or tear the tape linings. When the saddle is in the full out position, the housing 14' is pushed so that its ways are in contact with the corresponding surfaces of the reading head and the cap screws are firmly tightened. The saddle is then moved slowly to the full in position to verify that no excessive binding between the reading head and the tape occurs and if there is no excessive binding, the tape is removed. Thus, the reading head 40' has a floating movement relative to the ways of the housing 14' in its movement, and as before, the spacing is such that the reading head will contact the ways of the housing before it will contact the scale confined within the housing.

The cables C for the X- and Y-axis readouts are then plugged into the display unit 12 and the device is ready for operation.

The complete installation procedure, as outlined above, requires as little as fifteen minutes and requires the use of only a very few simple tools, such as Allen wrenches. Moreover, when the structure as described herein is used with a Bridgeport milling machine, there is absolutely no modification required of the machine and existing structures thereon are utilized to mount the linear digital readout assembly to the machine.

The mounting means for the X- and Y-axis digital readout assemblies are exceptionally simple and comprise a minimum amount of parts, and once installed, guiding movement of the reading heads relative to the scales is accomplished by the ways of the machine. Further, the digital readout assemblies of the present invention provide a visual, digital indication of both the amount and direction of relative movement between the parts of the machine.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A digital readout assembly for milling machines and the like to provide a digital display indicating relative movement between relatively movable parts of the machine, comprising: a housing means, an elongate scale means fixedly carried by the housing means; adjustable mounting means connected with said housing means and secured to one of said machine parts rigidly securing the housing means and scale means to said one machine part in predetermined, adjusted, aligned relationship relative thereto; reading head means disposed in preassembled, prealigned, operative relationship to said housing means and scale means and free of engagement with said scale means; adjustable reading head mounting means secured to the reading head means and to another of said machine parts rigidly securing said reading head means to the other of said machine parts in predetermined, adjusted, aligned relationship relative thereto; removable pre-alignment spacer means on the housing means engageable by said reading head means to prealign the reading head means relative to the housing means and scale means; and digital display means connected to the reading head means to give a visual indication of relative movements between the scale means and reading head means and thus between the relatively movable machine parts, whereby during installation of the assembly on a machine, the reading head means can be accurately aligned relative to said scale means while being maintained in spaced relation thereto, and after alignment of said reading head means relative to said scale means, said removable spacer means is removed so that said reading head means is free of engagement with the housing means and scale means during use of the assembly, and relative movement between the reading head means and scale means is guided solely by the machine ways and is thus dependent only upon the relative movement between said relatively movable machine parts and relative movement between the machine parts is thus accurately measured and indicated.

2. A digital readout assembly as in claim 1, wherein said housing means has reading head prealignment guide surfaces thereon, said mounting means for the housing means operatively supports said reading head guide surfaces parallel to the direction of relative movement between said machine parts, prealignment guide surfaces on said reading head means for cooperation with the guide surfaces on the housing means, said removable prealignment spacer means secured on the guide surfaces on the housing means, whereby the guide surfaces on the reading head means may be engaged with the spacer means to accurately align the reading head means relative to the scale means upon installation of the assembly to the machine, and said reading head mounting means operatively supports said reading head guide surfaces in aligned, spaced relationship with the guide surfaces on the housing means when the assembly is in use, so that relative movement between the reading head means and scale means is responsive to and guided only by the movement of the machine parts.

3. A digital readout assembly as in claim 2, wherein said housing means is elongate and has substantially an inverted U-shaped cross-sectional configuration and includes a top wall, a front wall and a back wall, said reading head guide surfaces being on lower edge portions of said front and back walls, said reading head means preassembled and prealigned to the housing means between the front and back walls thereof, with the guide surfaces thereon cooperatively associated with the guide surfaces on the front and back walls.

4. A digital readout assembly as in claim 3, wherein said adjustable mounting means for the housing means comprises threaded fastening means extended through openings at opposite ends of the housing means and secured at one end thereof to said one part of said machine, and said reading head mounting means comprises threaded fastening means connected to said reading head means and to said other part of said machine.

5. A digital readout assembly as in claim 2, wherein said machine includes a part normally stationary in a horizontal direction, a first movable part supported on said stationary part and movable in a first horizontal direction relative to said stationary part, and a second movable part supported on said first movable part for movement in a second horizontal direction perpendicular to said first direction of movement, and a digital readout assembly means operatively connected to each of said movable machine parts for measuring and indicating said movement in said first and second directions, respectively, one of said assemblies operatively mounted to measure movement of the first machine part and the other of said assemblies operatively mounted to measure movement of said second machine part.

6. A digital readout assembly as in claim 5, wherein said second machine part has an elongate channel therein with a substantially T-shaped cross-sectional configuration, threaded nuts in said channel, threaded fastening means extended through openings in opposite ends of the housing means of one of said readout assemblies and threadably engaged with said nuts in said channel to secure said housing means to said second machine part, and said reading head mounting means including a mounting block, threaded fastening means extended through said mounting block and into threaded openings in said first machine part, and a slide block secured to both the mounting block and the reading head means to secure said reading head means to said first machine part and thus measure relative movements between said first and second machine parts along an X-axis.

7. A digital readout assembly as in claim 5, wherein said stationary machine part has a pair of spaced apart threaded openings therein, mounting block spacer means disposed in surrounding relationship to each opening, a mounting block secured to said stationary machine part at one of said openings and spaced from said stationary machine part by said mounting block spacer means, a mounting bracket secured to said mounting block, threaded fastening means extended through one end of the housing means of the other of said readout assemblies and into said mounting bracket to secure said one end of said housing means to said stationary part in spaced relationship thereto, and threaded fastening means extended through the other end of the housing means and through said mounting block spacer means and threadably engaged in said threaded opening in said stationary machine part to secure said other end of said housing means to said stationary part in spaced relationship thereto, to thus measure relative movements between said first and second machine parts along a Y-axis.

8. A digital readout assembly as in claim 7, wherein the reading head mounting means for the digital readout assembly on the Y-axis of the machine includes an L-shaped mounting plate secured at one end thereof to said first machine part and secured at the other end thereof to said reading head means, said L-shaped mounting plate including one leg extending downwardly alongside said housing means outwardly from the machine part, and another leg extending rearwardly toward the machine beneath the housing means and reading head means.

9. A digital readout assembly as in claim 8, wherein said second machine part has an elongate channel therein with a substantially T-shaped cross-sectional configuration, threaded nuts in said channel, threaded fastening means extended through openings in opposite ends of the housing means of one of said readout assemblies and threadably engaged with said nuts in said channel to secure said housing means to said second machine part, and said reading head mounting means including a mounting block, threaded fastening means extended through said mounting block and into threaded openings in said first machine part, and a slide block secured to both the mounting block and the reading head means to secure said reading head means to said first machine part and thus measure relative movements between said first and second machine parts along an X-axis.

* * * * *